US009758847B2

(12) United States Patent
Miyata et al.

(10) Patent No.: US 9,758,847 B2
(45) Date of Patent: Sep. 12, 2017

(54) HOT-ROLLED STEEL SHEET FOR HIGH-STRENGTH GALVANIZED STEEL SHEET OR HIGH-STRENGTH GALVANNEALED STEEL SHEET AND METHOD FOR MANUFACTURING THE SAME (AS AMENDED)

(71) Applicant: JFE STEEL CORPORATION, Chiyoda-ku, Tokyo (JP)

(72) Inventors: Mai Miyata, Fukuyama (JP); Yoshitsugu Suzuki, Fukuyama (JP); Yasunobu Nagataki, Tokyo (JP); Yoshiyasu Kawasaki, Chiba (JP); Hirokazu Sugihara, Fukuyama (JP)

(73) Assignee: JFE Steel Corporation, Tokyo (JP)

( * ) Notice: Subject to any disclaimer, the term of this patent is extended or adjusted under 35 U.S.C. 154(b) by 0 days.

(21) Appl. No.: 14/354,810

(22) PCT Filed: Nov. 2, 2012

(86) PCT No.: PCT/JP2012/007031
§ 371 (c)(1),
(2) Date: Apr. 28, 2014

(87) PCT Pub. No.: WO2013/073124
PCT Pub. Date: May 23, 2013

(65) Prior Publication Data
US 2014/0314616 A1 Oct. 23, 2014

(30) Foreign Application Priority Data

Nov. 17, 2011 (JP) ................. 2011-251960

(51) Int. Cl.
| *C22C 38/18* | (2006.01) |
| *C22C 1/10* | (2006.01) |
| *C23C 2/02* | (2006.01) |
| *C23C 2/28* | (2006.01) |
| *C22C 38/00* | (2006.01) |
| *C22C 38/06* | (2006.01) |
| *C21D 8/02* | (2006.01) |
| *B32B 15/01* | (2006.01) |
| *C22C 38/02* | (2006.01) |
| *C22C 38/04* | (2006.01) |
| *B21B 3/02* | (2006.01) |
| *B21B 45/08* | (2006.01) |
| *C22C 38/08* | (2006.01) |
| *C22C 38/12* | (2006.01) |
| *C22C 38/14* | (2006.01) |
| *C22C 38/16* | (2006.01) |
| *C21D 9/46* | (2006.01) |

(52) U.S. Cl.
CPC ............... *C22C 38/18* (2013.01); *B21B 3/02* (2013.01); *B21B 45/08* (2013.01); *B32B 15/013* (2013.01); *C21D 8/0226* (2013.01); *C21D 8/0236* (2013.01); *C21D 8/0273* (2013.01); *C22C 38/00* (2013.01); *C22C 38/001* (2013.01); *C22C 38/002* (2013.01); *C22C 38/005* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C23C 2/02* (2013.01); *C23C 2/28* (2013.01); *C21D 9/46* (2013.01)

(58) Field of Classification Search
CPC ..... C22C 1/1078; C22C 29/12; C22C 32/001; C22C 32/0015; C21D 9/46; B21B 45/08
See application file for complete search history.

(56) References Cited

U.S. PATENT DOCUMENTS

| 8,592,049 B2* | 11/2013 | Honda ................. B32B 15/013 428/639 |
| 2007/0144620 A1* | 6/2007 | Soshiroda ............. C21D 6/008 148/320 |
| 2010/0304183 A1* | 12/2010 | Honda ................. C21D 8/0263 428/659 |

(Continued)

FOREIGN PATENT DOCUMENTS

| EP | 1612288 | 1/2006 |
| EP | 1669470 | 6/2006 |

(Continued)

OTHER PUBLICATIONS

Extended European Search Report mailed Jun. 15, 2015 in European Application No. 12850136.8.
International Search Report dated Jan. 22, 2013, application No. PCT/JP2012/007031.
Chinese Office Action mailed Feb. 4, 2016 for Chinese Application No. 201280056638.6, with Concise Statement of Relevance of Office Action.
EPO Office Communication for Application No. 12850136.8-1373, dated May 12, 2016, 7 pages.
Chinese Office Action for Application No. 201280056638.6, dated Oct. 14, 2016, with Concise Statement of Relevance, 11 pages.
Zhu et al., Excerpt of Steel Pickling Technology, Aug. 31, 2007, Chemical Industry Press, p. 16.

(Continued)

*Primary Examiner* — Roy King
*Assistant Examiner* — Vanessa Luk
(74) *Attorney, Agent, or Firm* — RatnerPrestia

(57) ABSTRACT

Provided is a hot-rolled steel sheet having a composition containing 0.04 mass percent to 0.20 mass percent C, 0.7 mass percent to 2.3 mass percent Si, 0.8 mass percent to 2.8 mass percent Mn, 0.1 mass percent or less P, 0.01 mass percent or less S, 0.1 mass percent or less Al, and 0.008 mass percent or less N, the remainder being Fe and inevitable impurities. Internal oxides containing one or more selected from the group consisting of Si, Mn, and Fe are present at grain boundaries and in grains in a base metal. The internal oxides present at the grain boundaries in the base metal are located within 5 μm from the surface of the base metal. The difference between the depths at which the internal oxides are formed in the cross direction of the steel sheet is 2 μm or less.

16 Claims, No Drawings

(56) References Cited

U.S. PATENT DOCUMENTS

2011/0217569 A1  9/2011  Fushiwaki
2013/0048155 A1  2/2013  Kaneko

FOREIGN PATENT DOCUMENTS

| JP | 0770649 | 3/1995 | | |
|----|---------|--------|---|---|
| JP | 2000192190 | 7/2000 | | |
| JP | 2001-207239 A | 7/2001 | | |
| JP | 3956550 | 5/2007 | | |
| JP | 2007-211279 A | 8/2007 | | |
| JP | WO 2007086158 A1 * | 8/2007 | ............... | C21D 9/46 |
| JP | 2007-277661 A | 10/2007 | | |
| JP | 4035117 B2 | 1/2008 | | |
| JP | 2008248358 A * | 10/2008 | | |
| JP | 2010-255100 A | 11/2010 | | |
| JP | 2011-168877 A | 9/2011 | | |
| WO | 2011090184 | 7/2011 | | |

OTHER PUBLICATIONS

Chinese Office Action with partial English language translation for Application No. 201280056638.6, dated Mar. 30, 2017, 8 pages.

* cited by examiner

HOT-ROLLED STEEL SHEET FOR HIGH-STRENGTH GALVANIZED STEEL SHEET OR HIGH-STRENGTH GALVANNEALED STEEL SHEET AND METHOD FOR MANUFACTURING THE SAME (AS AMENDED)

CROSS REFERENCE TO RELATED APPLICATIONS

This is the U.S. National Phase application of PCT/JP2012/007031, filed Nov. 2, 2012, which claims priority to Japanese Patent Application No. 2011-251960, filed Nov. 17, 2011, the disclosures of each of these applications being incorporated herein by reference in their entireties for all purposes.

FIELD OF THE INVENTION

The present invention relates to a hot-rolled steel sheet for a high-strength galvanized steel sheet or high-strength galvannealed steel sheet, suitable for use in automotive parts, having excellent surface stability and a method for manufacturing the same.

BACKGROUND OF THE INVENTION

In recent years, with the rising awareness of global environmental protection, improvements in fuel efficiency have been strongly required for reducing automobile $CO_2$ emissions. This has led to active attempts to achieve gauge reduction by increasing the strength of automobile body materials to reduce automobile weight. However, the increase in strength of steel sheets may possibly cause the reduction in ductility thereof. Therefore, the development of a high-strength, high-ductility steel sheet is demanded.

In order to increase the strength of steel sheets, a solid solution strengthening element such as Si, Mn, P, or Al is added. In particular, Si and Al have an advantage that the strength of steel can be increased without impairing the ductility thereof; hence, a Si-containing steel sheet is promising as a high-strength steel sheet. However, in the case of manufacturing a galvanized steel sheet or a galvannealed steel sheet using a high-strength steel sheet containing a large amount of Si as a base material, there are problems below.

In the course of manufacturing a galvanized steel sheet, after heating and annealing are performed at a temperature of about 600° C. to 900° C. in a non-oxidizing atmosphere or a reducing atmosphere, galvanizing is performed. However, Si in steel is an oxidizable element. Therefore, Si is selectively oxidized in a non-oxidizing or reducing atmosphere usually used, is concentrated at the surface, and forms an oxide. Since the oxide reduces the wettability with molten zinc during plating to cause bare spots, the wettability decreases sharply with the increase in concentration of Si in steel and therefore bare spots are frequently caused. Even in the case of causing no bare spots, there is a problem in that the controllability of coating weight is poor or alloying is significantly delayed. In particular, the delay of alloying is likely to cause a difference in alloying rate between in the longitudinal direction and cross direction of a steel sheet; hence, it is difficult to achieve a uniform surface.

Furthermore, it is difficult to remove scale from Si-containing steel by descaling in a hot rolling process and therefore scale defects called red scale are caused in the surface thereof. Even in the case where no red scale is formed, water is unevenly applied to a surface of a steel sheet and therefore regions different in scale removal in the cross direction of the steel sheet are present. While scale remaining after descaling is removed by pickling after hot rolling, the regions different in scale removal have different surface properties. Therefore, unevenness occurs in a subsequent galvannealing step to cause defects with a striped pattern.

Among these problems, as for the surface concentration of Si, Patent Literature 1 proposes a method for improving the wettability with molten zinc in such a way that after iron oxide is formed on a surface of a steel sheet by heating the steel sheet in an oxidizing atmosphere in advance, the steel sheet is subjected to reduction annealing. Patent Literature 2 proposes a method for suppressing the surface concentration of Si in such a way that the potential of oxygen is reduced in a reduction annealing process.

On the other hand, as for descaling, Patent Literature 3 proposes a method for enhancing descaling by increasing the spraying pressure of high-pressure water.

PATENT LITERATURE

PTL 1: Japanese Patent No. 3956550
PTL 2: Japanese Unexamined Patent Application Publication No. 2010-255100
PTL 3: Japanese Patent No. 4035117

SUMMARY OF THE INVENTION

However, the method proposed in Patent Literature 1 or 2 does not take into account any irregularities in the longitudinal direction and cross direction of a steel strip. Moreover, the method cannot cope with the case where an unannealed cold-rolled steel sheet has irregularities. The method may possibly significantly increase the irregularities instead. In Patent Literature 3, measures against surface irregularities in a hot rolling process are proposed and, however, the interference of sprayed water is not taken into account; hence, descaling unevenness cannot be eliminated.

The present invention aims to provide a hot-rolled steel sheet capable of obtaining a galvanized steel sheet or galvannealed steel sheet which solves problems with the above conventional techniques, which has high strength (a tensile strength TS of 540 MPa or more), and which is excellent in surface appearance.

The present invention also aims to provide a method capable of stably manufacturing such a hot-rolled steel sheet.

The inventors have conducted intensive investigations to obtain a hot-rolled steel sheet which contains Si and which is used to manufacture a galvanized steel sheet or galvannealed steel sheet having excellent surface appearance. As a result, the inventors have found facts below.

As a result of investigating measures against defects caused in surfaces of galvanized and galvannealed steel sheets, alloying unevenness, and irregularities due to oxides formed in steel sheets before annealing, it has been found that irregularities due to oxides formed in a hot rolling process have a significant influence. That is, it has been found that when the oxides formed in the hot rolling process are irregular, Si oxides formed on a surface of a steel sheet during subsequent annealing are irregular, which causes unevenness in coating weight and alloying unevenness after plating.

As a result of focusing on and investigating internal oxides formed during hot rolling, it has been found that when the depths at which the internal oxides are formed at base metal grain boundaries are 5 μm or less, the occurrence of irregularities on a plated steel sheet tends to be suppressed. This is probably because in the case where the internal oxides are formed at the base metal grain boundaries, the grain boundaries are preferentially corroded in a subsequent pickling step and therefore irregularities due to the depths at which the internal oxides are formed are increased. Furthermore, it has been found that when the difference between the depths at which the internal oxides are formed at grain boundaries in the cross direction of a steel sheet is 2 μm or less, irregularities on a plated steel sheet are substantially eliminated.

The internal oxides are formed during hot rolling because oxygen is supplied into a steel sheet from scale after coiling. Thus, the formation of the internal oxides can be suppressed by reducing the coiling temperature and thereby irregularities on a plated steel sheet can be suppressed.

However, it has been found that irregularities due to the internal oxides are not eliminated in the cross direction of a steel sheet in some cases even though the coiling temperature is reduced. Therefore, as a result of focusing on and investigating the relationship between the internal oxides and the surface condition, from the comparison of regions different in scale removal for the state of the internal oxides formed therein, it has been found that internal oxidation tends to be suppressed in regions where scale has been removed and tends to be promoted in regions where the removal of scale is poor. This is probably because in the regions where the removal of scale is poor, oxygen is supplied into a steel sheet from scale before coiling and, however, in the regions where scale has been removed, oxygen is not supplied thereinto. As a result, the difference between the depths at which the internal oxides are formed is more than 2 μm and therefore irregularities on a plated steel sheet are probably caused. Thus, it has been found that scale needs to be evenly removed in order to suppress the uneven formation of the internal oxides.

Furthermore, it is desired that the internal oxides are not formed as far as possible in a hot rolling step. However, in the hot rolling step, plating properties may possibly be improved by promoting the formation of the internal oxides. Therefore, as a result of investigating the relationship between the amount of components of a steel sheet and the amount of the internal oxides formed therein, it has been found that when the mass ratio of Si to Mn contained in the steel sheet is less than 1, the surface concentration of Si is suppressed and internal oxidation is, however, promoted even under the same annealing conditions.

The present invention has been made on the basis of the above findings and includes the following.

(1) A hot-rolled steel sheet for a high-strength galvanized steel sheet or a high-strength galvannealed steel sheet has a composition containing 0.04 mass percent to 0.20 mass percent C, 0.7 mass percent to 2.3 mass percent Si, 0.8 mass percent to 2.8 mass percent Mn, 0.1 mass percent or less P, 0.01 mass percent or less S, 0.1 mass percent or less Al, and 0.008 mass percent or less N, the remainder being Fe and inevitable impurities. Internal oxides containing one or more selected from the group consisting of Si, Mn, and Fe are present at grain boundaries and in grains in a base metal. The internal oxides present at the grain boundaries in the base metal are located within 5 μm from the surface of the base metal. The difference between the depths at which the internal oxides are formed in the cross direction of the steel sheet is 2 μm or less.

(2) In the hot-rolled steel sheet specified in Item (1), the mass ratio (Si/Mn) of Si to Mn in the composition is less than 1.

(3) In the hot-rolled steel sheet specified in Item (1) or (2), the composition further contains one or more selected from the group consisting of 0.05 mass percent to 1.0 mass percent Cr, 0.005 mass percent to 0.5 mass percent V, 0.005 mass percent to 0.5 mass percent Mo, 0.05 mass percent to 1.0 mass percent Ni, and 0.05 mass percent to 1.0 mass percent Cu.

(4) In the hot-rolled steel sheet specified in any one of Items (1) to (3), the composition further contains one or more selected from the group consisting of 0.01 mass percent to 0.1 mass percent Ti, 0.01 mass percent to 0.1 mass percent Nb, and 0.0003 mass percent to 0.0050 mass percent B.

(5) In the hot-rolled steel sheet specified in any one of Items (1) to (4), the composition further contains one or more selected from 0.001 mass percent to 0.005 mass percent Ca and 0.001 mass percent to 0.005 mass percent of a REM.

(6) A method for manufacturing a hot-rolled steel sheet for a high-strength galvanized steel sheet or a high-strength galvannealed steel sheet includes a hot rolling process of roughly rolling a steel slab having the composition specified in any one of Items (1) to (5), performing descaling by spraying high-pressure water at an impact pressure of 0.3 MPa to less than 1.8 MPa before finish rolling, performing finish rolling at a finishing temperature of 850° C. or higher, and then performing coiling at 450° C. to 650° C.

In this invention, a "galvanized steel sheet" or "galvannealed steel sheet" is a galvanized steel sheet or galvannealed steel sheet which has high a tensile strength TS of 540 MPa or more.

In accordance with a hot-rolled steel sheet according to the present invention, a galvanized steel sheet or galvannealed steel sheet which has high strength (a tensile strength TS of 540 MPa or more) and which is excellent in surface appearance can be manufactured. These plated steel sheets can be used particularly in automobile structural parts, whereby improvements in fuel efficiency due to automobile weight reduction are achieved.

Furthermore, in accordance with a manufacturing method according to the present invention, such a hot-rolled steel sheet can be stably manufactured.

DETAILED DESCRIPTION OF EMBODIMENTS OF THE INVENTION

The present invention is described below in detail with reference to exemplary embodiments.

First, components of a steel sheet are described. A hot-rolled steel sheet according to the present invention preferably has a composition containing 0.04 mass percent to 0.20 mass percent C, 0.7 mass percent to 2.3 mass percent Si, 0.8 mass percent to 2.8 mass percent Mn, 0.1 mass percent or less P, 0.01 mass percent or less S, 0.1 mass percent or less Al, and 0.008 mass percent or less N, the remainder being Fe and inevitable impurities. In the above composition, the mass ratio (Si/Mn) of Si to Mn is preferably less than 1.

C: 0.04 Mass Percent to 0.20 Mass Percent

C is an element which produces austenite, which allows the microstructure of an annealed sheet to be multiphase, and which is effective in increasing the strength and the ductility. When the content of C is less than 0.04 mass percent, it is difficult to ensure the strength of the annealed sheet. However, in the case where C is excessively added such that the content thereof is more than 0.20 mass percent, welds and heat-affected zones are significantly hardened and mechanical properties of the welds are deteriorated; hence, spot weldability and arc weldability, and the like are reduced. Therefore, the C content is 0.04 mass percent to 0.20 mass percent. From the above viewpoints, the C content is more preferably 0.05 mass percent to 0.14 mass percent and particularly preferably 0.07 mass percent to 0.12 mass percent.

Si: 0.7 Mass Percent to 2.3 Mass Percent

Si is an element which produces ferrite and which is effective in increasing the solid solution strengthening of ferrite in the annealed sheet and the work hardenability thereof. A problem with alloying unevenness due to descaling unevenness becomes obvious when the content of Si is 0.7 mass percent or more. However, when the Si content is more than 2.3 mass percent, unevenness in mass per unit area and alloying unevenness are unavoidable in a manufacturing method below. Therefore, the Si content is 0.7 mass percent to 2.3 mass percent.

Mn: 0.8 Mass Percent to 2.8 Mass Percent

Mn is an element which produces austenite and which is effective in ensuring the strength of the annealed sheet. When the content of Mn is less than 0.8 mass percent, it is difficult to ensure the strength thereof. However, in the case where Mn is excessively added such that the content thereof is more than 2.8 mass percent, ferrite transformation and pearlite transformation are delayed in a hot rolling process and therefore the quality may possibly be reduced. In addition, cost increases are caused because in recent years, alloying costs have been significantly increased. Therefore, the Mn content is 0.8 mass percent to 2.8 mass percent. Furthermore, from the above viewpoints, the Mn content is more preferably 1.2 mass percent to 2.8 mass percent.

P: 0.1 Mass Percent or Less

P is an element which is effective in strengthening steel. However, in the case where P is excessively added such that the content thereof is more than 0.1 mass percent, intergranular segregation causes embrittlement to deteriorate impact resistance. In addition, when the content is more than 0.1 mass percent, the alloying rate is significantly reduced. Therefore, the content of P is 0.1 mass percent or less. Furthermore, from the above viewpoints, the P content is more preferably 0.02 mass percent or less.

S: 0.01 Mass Percent or Less

S forms inclusions such as MnS to cause the deterioration of impact resistance or cracks along metal flows in welds; hence, the content is preferably as low as possible. The content of S is 0.01 mass percent or less in terms of manufacturing costs. Furthermore, from the above viewpoints, the S content is more preferably 0.005 mass percent or less.

Al: 0.1 Mass Percent or Less

The excessive addition of Al causes the deterioration of surface properties and formability due to the increase of oxide inclusions and also causes cost increases. Therefore, the content of Al is 0.1 mass percent or less. Furthermore, from the above viewpoints, the Al content is more preferably 0.05 mass percent or less.

N: 0.008 Mass Percent or Less

N is an element which most significantly deteriorates the ageing resistance of steel and is preferably low. When the content thereof is more than 0.008 mass percent, the deterioration of ageing resistance is significant. Therefore, the N content is 0.008 mass percent or less.

Mass Ratio (Si/Mn) of Si to Mn: Less than 1

When the mass ratio (Si/Mn) of Si to Mn contained in a steel sheet is less than 1, the formation oxygen potential of a composite oxide containing Si and Mn is reduced and therefore Si is likely to form internal oxides in the steel sheet in the form of composite oxides. As a result, the surface concentration of Si during annealing is suppressed and surface irregularities are unlikely to be caused during annealing. Therefore, the mass ratio (Si/Mn) of Si to Mn is preferably less than 1.

The hot-rolled steel sheet according to the present invention may contain an alloying element below in addition to the above component elements as required.

One or More Selected from the Group Consisting of 0.05 Mass Percent to 1.0 Mass Percent Cr, 0.005 Mass Percent to 0.5 Mass Percent V, 0.005 Mass Percent to 0.5 Mass Percent Mo, 0.05 Mass Percent to 1.0 Mass Percent Ni, and 0.05 Mass Percent to 1.0 Mass Percent Cu.

Cr, V, Mo, Ni, and Cu are elements which are effective in strengthening steel and may be used to strengthen steel within a range specified in the present invention. Such an effect is obtained when Cr is 0.05 mass percent or more, V is 0.005 mass percent or more, Mo is 0.005 mass percent or more, Ni is 0.05 mass percent or more, or Cu is 0.05 mass percent or more. However, in the case where Cr, V, Mo, Ni, or Cu is excessively added such that Cr is more than 1.0 mass percent, V is more than 0.5 mass percent, Mo is more than 0.5 mass percent, Ni is more than 1.0 mass percent, or Cu is more than 1.0 mass percent, the fraction of a second phase such as martensite is excessive and therefore concerns about a reduction in ductility due to a significant increase in strength arise. In addition, cost increases are caused. Therefore, in the case of adding these elements, the Cr content is 0.05 mass percent to 1.0 mass percent, the V content is 0.005 mass percent to 0.5 mass percent, the Mo content is 0.005 mass percent to 0.5 mass percent, the Ni content is 0.05 mass percent to 1.0 mass percent, and the Cu content is 0.05 mass percent to 1.0 mass percent.

One or More Selected from the Group Consisting of 0.01 Mass Percent to 0.1 Mass Percent Ti, 0.01 Mass Percent to 0.1 Mass Percent Nb, and 0.0003 Mass Percent to 0.0050 Mass Percent B.

Ti and Nb are elements which are effective in precipitation-hardening steel. Such an effect is obtained when Ti is 0.01 mass percent or more or Nb is 0.01 mass percent or more. In addition, B is an element which is effective in strengthening steel. Such an effect is obtained at 0.0003 mass percent or more. However, in the case where Ti, Nb, or B is excessively added such that Ti is more than 0.1 mass percent, Nb is more than 0.1 mass percent Nb, or B is more than 0.0050 mass percent, the fraction of a second phase such as martensite is excessive and therefore concerns about a reduction in ductility due to a significant increase in strength arise. In addition, cost increases are caused. Therefore, in the case of adding these elements, the Ti content is 0.01 mass percent to 0.1 mass percent, the content Nb is 0.01 mass percent to 0.1 mass percent, and the B content is 0.0003 mass percent to 0.0050 mass percent.

One or More Selected from 0.001 Mass Percent to 0.005 Mass Percent Ca and 0.001 Mass Percent to 0.005 Mass Percent REM.

Ca and a REM are elements which are effective in spheroidizing sulfides to improve the adverse effect of the sulfides on local ductility. In order to achieve such an effect, one or both of Ca and REM need to be added 0.001 mass percent or more. However, the excessive addition thereof causes the increase of inclusions and also causes surface and internal defects. Thus, in the case of adding Ca or the REM, the amount of Ca or the REM added is 0.001 mass percent to 0.005 mass percent.

Conditions for forming internal oxides in a steel sheet are described below. The hot-rolled steel sheet according to embodiments of the present invention is conditional on that internal oxides containing one or more selected from the group consisting of Si, Mn, and Fe are present at grain boundaries and in grains in a base metal, the internal oxides present at the grain boundaries in the base metal are located within 5 μm from the surface of the base metal, and the difference between the depths at which the internal oxides are formed in the cross direction of the steel sheet is 2 μm or less.

The Fact that Internal Oxides Containing One or More Selected from the Group Consisting of Si, Mn, and Fe are Present at Grain Boundaries and in Grains in a Base Metal and the Internal Oxides Present at the Grain Boundaries are Located within 5 μm from the Surface of the Base Metal.

When a slab containing Si is heated for hot rolling, internal oxides containing Si and/or Mn are produced. The internal oxides are formed at grain boundaries present in a steel sheet and in grains located near a surface of the steel sheet, the grain boundaries and the grains having relatively high oxygen potential. If the internal oxides are formed more than 5 μm apart from a surface layer of the steel sheet, then the depths at which the internal oxides are formed are likely to uneven, which therefore leads to unevenness in surface concentration during annealing. Among the internal oxides, Si-containing internal oxides are likely to cause such a problem. Alternatively, if the oxides are formed in the grains, then the internal oxides are removed together with the grains having the internal oxides by subsequent pickling. However, if the internal oxides are formed at the grain boundaries, then the grain boundaries are preferentially corroded, which therefore causes irregularities. Therefore, the existing range of the oxides present at the grain boundaries is within 5 μm from the surface of the base metal.

The Fact that the Difference Between the Depths at which Internal Oxides are Formed at Grain Boundaries in the Cross Direction of a Steel Sheet is 2 μm or Less.

When the depths at which the internal oxides are formed at the grain boundaries vary in the cross direction of the steel sheet, the formation state of surface concentration varies in the annealing step and irregularities on a plated steel sheet are caused. When the difference between the depths at which internal oxides are formed in the cross direction of the steel sheet is more than 2 μm, the irregularities on a plated steel sheet are significant. Therefore, the difference between the depths at which internal oxides are formed in the cross direction of the steel sheet is 2 μm or less.

In order to confirm the internal oxides, a thickness-section embedment polishing sample of the steel sheet is observed with a scanning electron microscope (SEM). The internal oxides contain a light element and therefore can be identified as portions with a darker contrast than the steel sheet as observed in a SEM reflection electron image.

In the present invention, in order to determine the maximum depth at which the internal oxides are formed at the grain boundaries and the difference between the depths at which the internal oxides are formed at the grain boundaries in the cross direction of the steel sheet, samples are taken from eight portions of the steel sheet at intervals different from the intervals between descaling nozzles in the cross direction of the steel sheet and the depth at which each internal oxide is formed is measured by cross-section observation as described above. The reason why the samples are taken under such a condition is that the descaling nozzles are arranged at equal intervals in the cross direction of the steel sheet and descaling properties are different from portions directly under the nozzles and portions between the nozzles. The maximum of the depths at which the internal oxides are formed is defined as the maximum depth at which the internal oxides are formed and the difference between the maximum depth and minimum depth at which the internal oxides are formed is defined as the difference between the depths at which the internal oxides are formed.

An embodiment of a method for manufacturing the hot-rolled steel sheet according to the present invention is described below.

In the method for manufacturing the hot-rolled steel sheet according to an embodiment of the present invention, a steel slab having the above composition is roughly rolled, is descaled by spraying high-pressure water at an impact pressure of 0.3 MPa to less than 1.8 MPa before finish rolling, is finish-rolled at a finishing temperature of 850° C. or higher, and is then coiled at 450° C. to 650° C. in a hot rolling step, whereby the hot-rolled steel sheet can be manufactured.

Produced steel is made into a slab through slabbing an ingot or continuous casting and the slab is hot-rolled into the hot-rolled steel sheet. The heating temperature of the slab is not particularly limited and is preferably about 1,100° C. to 1,300° C. In the hot rolling step, after rough rolling, descaling is performed by spraying high-pressure water before finish rolling, finish rolling is performed, and coiling is subsequently performed.

Descaling Performed after Rough Rolling by Spraying High-Pressure Water at an Impact Pressure of 0.3 MPa to Less than 1.8 MPa Before Finish Rolling.

When the impact pressure of high-pressure water sprayed for descaling is less than 0.3 MPa, a large amount of scale remains and therefore scale defects are caused. The impact pressure of high-pressure water sprayed for descaling is preferably high from the viewpoint of scale removal. In particular, for a steel sheet containing Si, high-pressure descaling is common because of deteriorated scale-removing properties. However, the impact pressure varies in the cross direction of the steel sheet depending on the distance from each nozzle and the interference of high-pressure water sprayed from the neighboring descaling nozzles and therefore the removal of scale varies. The uneven removal of scale leads to the uneven formation of the internal oxides. Furthermore, in regions where scale is unevenly removed, surface properties are different and therefore striped patterns are formed in some cases after alloying even though the mass per unit area or the degree of alloying is not uneven. The tendency to cause such unevenness in the cross direction of the steel sheet is significant at an impact pressure of 1.8 MPa or more. Therefore, the impact pressure is 0.3 MPa to less than 1.8 MPa.

Hot Rolling Finishing Temperature: 850° C. or Higher

When the hot rolling finishing temperature is lower than 850° C., descaling properties are poor and therefore scale is unlikely to be removed; hence, scale defects are caused. Therefore, the hot rolling finishing temperature is 850° C. or higher.

Hot Rolling Coiling Temperature: 450° C. to 650° C.

When the hot rolling coiling temperature is higher than 650° C., large amounts of the internal oxides are produced and the depths at which the internal oxides are present are more than 5 μm. In contrast, when the hot rolling coiling temperature is lower than 450° C., the internal oxides are hardly produced but large amounts of low-temperature transformed phases such as martensite and bainite are formed; hence, uneven hardness distribution is caused in the cross direction of the steel sheet and therefore the quality is likely to be deteriorated. Therefore, the hot rolling coiling temperature is 450° C. to 650° C.

Incidentally, in the hot rolling step of the method according to the present invention, heat treatment may be performed using any facility satisfying thermal history conditions.

The hot-rolled steel sheet, according to the present invention, obtained as described above is usually pickled, is subjected to pre-treatment such as degreasing as required, is cold-rolled as required, and is then subjected to annealing treatment and galvanizing treatment. The annealing treatment and the galvanizing treatment may be performed in a usually known process under such conditions that, for example, the surface concentration of Si is suppressed by pre-treatment prior to annealing or the reduction in oxygen potential of an annealing atmosphere and no bare spots are caused. In addition, in the case of performing alloying treatment after galvanizing, temper rolling may be performed for shape correction after the alloying treatment.

Examples

Steels having compositions shown in Table 1, the remainder being Fe and inevitable impurities, were produced in a converter and were then cast into slabs by a continuous casting process. The obtained slabs were hot-rolled in such a way that the slabs were heated to 1,200° C., was roughly rolled, were descaled by spraying high-pressure water, and were subsequently finish-rolled to a thickness of 2.3 mm to 4.5 mm, followed by coiling. Next, obtained hot-rolled steel sheets were pickled, were cold-rolled as required, and were then subjected to annealing and galvanizing treatment in a continuous galvanizing line, followed by alloying treatment after the galvanizing treatment as required, whereby galvanized steel sheets and galvannealed steel sheets were obtained.

Samples taken from the hot-rolled steel sheets were measured for the maximum depth at which internal oxides were formed at grain boundaries and the difference between the depths at which the internal oxides were formed at the grain boundaries in the cross direction of the steel sheets. In the measurement of the maximum depth at which the internal oxides were formed at the grain boundaries, samples were taken from eight portions of each steel sheet in the cross direction of the steel sheet as described above, the depths at which the internal oxides were formed were measured by cross-sectional observation, and the maximum value was defined as the maximum depth at which internal oxides were formed. For the difference between the depths at which the internal oxides were formed at the grain boundaries in the cross direction of the steel sheets, samples were taken from eight portions of each steel sheet likewise, the depths at which the internal oxides were formed were measured by cross-sectional observation, and the difference between the maximum depth and minimum depth at which the internal oxides were formed was defined as the difference between the depths at which the internal oxides were formed.

In addition, the internal oxides were identified and measured in such a way that a cross-section embedment polishing sample of each steel sheet was observed with a scanning electron microscope (SEM) as described above. In this operation, the correspondence between the grain boundaries and regions having the internal oxides can be confirmed in such a way that the sample is etched under appropriate conditions and is then observed in the same field of view as that of the unetched sample.

In addition, the galvanized steel sheets and the galvannealed steel sheets were measured for the presence of surface scale defects and striped patterns, the coating mass per unit area in the cross direction of each steel sheet, and the degree of alloying, whereby the surface stability thereof was evaluated.

The coating mass per unit area and the degree of alloying were determined in such a way that a one-quarter position, two-quarter position, three-quarter position in the cross direction of each steel sheet, and positions 100 mm apart from both end portions of the steel sheet, totaling five positions, were measured for the coating mass per unit area and the degree of alloying and the difference between the maximum value and the minimum value was determined.

The presence of scale defects and striped patterns was visually checked after galvanizing and alloying.

From the above measurement results, the surface stability was comprehensively evaluated on the basis of standards below.

A: the case where scale defects and striped patterns are absent, the difference in coating mass per unit area is less than 2.0 $g/m^2$, and the difference in degree of alloying is less than 1%.

B: the case where scale defects and striped patterns are absent, the difference in coating mass per unit area is less than 5.0 $g/m^2$, and the difference in degree of alloying is less than 2% (except the case of "A").

C: the case where scale defects or striped patterns are present, the difference in coating mass per unit area is 5.0 $g/m^2$ or more, or the difference in degree of alloying is 2% or more.

The above results are shown in Tables 2 to 5. According to this, hot-rolled steel sheets of examples of the present invention all have a tensile strength TS of 540 MPa or more and are excellent in surface stability. On the other hand, in comparative examples, the difference in coating mass per unit area or the difference in degree of alloying is large and the surface stability is poor.

TABLE 1

| Steel type | Chemical components (mass percent) | | | | | | | | | | | |
| --- | --- | --- | --- | --- | --- | --- | --- | --- | --- | --- | --- | --- |
| | C | Si | Mn | Al | P | S | N | Ni | Cu | Cr | V | Mo |
| A | 0.089 | 1.52 | 1.48 | 0.031 | 0.015 | 0.0018 | 0.0032 | — | — | — | — | — |
| B | 0.045 | 1.35 | 2.10 | 0.030 | 0.009 | 0.0019 | 0.0028 | — | — | — | — | — |
| C | 0.195 | 1.05 | 1.45 | 0.027 | 0.013 | 0.0019 | 0.0031 | — | — | — | — | — |
| D | 0.120 | 0.80 | 1.85 | 0.029 | 0.018 | 0.0020 | 0.0029 | — | — | — | — | — |
| E | 0.065 | 2.20 | 2.45 | 0.032 | 0.009 | 0.0023 | 0.0030 | — | — | — | — | — |
| F | 0.130 | 0.90 | 0.85 | 0.031 | 0.009 | 0.0018 | 0.0034 | — | — | — | — | — |

TABLE 1-continued

| Steel type | C | Si | Mn | P | S | N | Al | ... | ... | Cu | Ni | Cr |
|---|---|---|---|---|---|---|---|---|---|---|---|---|
| G | 0.065 | 1.10 | 2.75 | 0.003 | 0.014 | 0.0021 | 0.0031 | — | — | — | — | — |
| H | 0.087 | 1.49 | 2.58 | 0.030 | 0.012 | 0.0017 | 0.0034 | — | — | — | — | — |
| I | 0.082 | 1.16 | 1.76 | 0.029 | 0.014 | 0.0017 | 0.0034 | — | — | — | — | — |
| J | 0.113 | 1.36 | 1.96 | 0.032 | 0.020 | 0.0021 | 0.0038 | — | — | — | — | — |
| K | 0.078 | 1.47 | 2.66 | 0.030 | 0.013 | 0.0020 | 0.0032 | — | — | — | — | — |
| L | 0.086 | 1.38 | 1.38 | 0.031 | 0.018 | 0.0019 | 0.0035 | — | — | 0.19 | — | — |
| M | 0.096 | 1.34 | 1.52 | 0.026 | 0.012 | 0.0018 | 0.0031 | — | — | — | 0.058 | — |
| N | 0.090 | 1.41 | 1.34 | 0.030 | 0.013 | 0.0024 | 0.0030 | — | — | — | — | 0.052 |
| O | 0.085 | 1.52 | 1.38 | 0.026 | 0.008 | 0.0019 | 0.0032 | — | — | — | — | — |
| P | 0.089 | 1.46 | 1.39 | 0.029 | 0.011 | 0.0026 | 0.0029 | — | — | — | — | — |
| Q | 0.073 | 1.32 | 1.51 | 0.030 | 0.013 | 0.0023 | 0.0036 | 0.22 | 0.16 | — | — | — |
| R | 0.093 | 1.46 | 1.55 | 0.026 | 0.009 | 0.0023 | 0.0031 | — | — | — | — | — |
| S | 0.089 | <u>3.25</u> | 1.13 | 0.034 | 0.022 | 0.0022 | 0.0033 | — | — | — | — | — |
| T | 0.092 | <u>2.43</u> | 1.38 | 0.029 | 0.019 | 0.0024 | 0.0032 | — | — | 0.17 | — | — |

| Steel type | Chemical components (mass percent) | | | | | Si/Mn (mass ratio) | Category |
|---|---|---|---|---|---|---|---|
| | Nb | Ti | B | Ca | REM | | |
| A | — | — | — | — | — | 1.03 | Example of present invention |
| B | — | — | — | — | — | 0.64 | Example of present invention |
| C | — | — | — | — | — | 0.72 | Example of present invention |
| D | — | — | — | — | — | 0.43 | Example of present invention |
| E | — | — | — | — | — | 0.90 | Example of present invention |
| F | — | — | — | — | — | 1.06 | Example of present invention |
| G | — | — | — | — | — | 0.40 | Example of present invention |
| H | — | — | — | — | — | 0.58 | Example of present invention |
| I | — | — | — | — | — | 0.66 | Example of present invention |
| J | — | — | — | — | — | 0.69 | Example of present invention |
| K | — | — | — | — | — | 0.55 | Example of present invention |
| L | — | — | — | — | — | 1.00 | Example of present invention |
| M | — | — | — | — | — | 0.88 | Example of present invention |
| N | — | — | — | — | — | 1.05 | Example of present invention |
| O | 0.024 | — | — | — | — | 1.10 | Example of present invention |
| P | — | 0.022 | 0.002 | — | — | 1.05 | Example of present invention |
| Q | — | — | — | — | — | 0.87 | Example of present invention |
| R | — | — | — | 0.002 | 0.001 | 0.94 | Example of present invention |
| S | — | — | — | — | — | 2.88 | Comparative example |
| T | — | — | — | — | — | 1.76 | Comparative example |

Underlined items are outside the scope of the present invention.
Amended sheet in accordance with Rule 91

TABLE 2

| No. | Steel type *1 | Finishing temperature (° C.) | Coiling temperature (° C.) | Impact pressure of high-pressure water for descaling (Mpa) | Thickness of hot-rolled sheet (mm) | Final sheet thickness (mm) | Alloying temperature (° C.) |
|---|---|---|---|---|---|---|---|
| 1 | A | 890 | 550 | 1.1 | 3.2 | 1.4 | 550 |
| 2 | A | 880 | 530 | 1.1 | 3.2 | 1.4 | — |
| 3 | A | 890 | 560 | 1.6 | 4.5 | 2.3 | 550 |
| 4 | A | 890 | 560 | 0.5 | 2.3 | 0.8 | 550 |
| 5 | A | 890 | 600 | 1.1 | 3.6 | 1.6 | 580 |
| 6 | A | 860 | 460 | 1.1 | 3.2 | 1.4 | — |
| 7 | A | 890 | 560 | 1.1 | 3.2 | 1.4 | 565 |
| 8 | A | 920 | 560 | 1.1 | 3.2 | 1.4 | 550 |
| 9 | A | 890 | 550 | 1.1 | 2.8 | 2.8 | 530 |
| 10 | A | 890 | 550 | 1.1 | 2.6 | 2.6 | — |
| 11 | A | 890 | 640 | 1.1 | 3.2 | 1.4 | — |
| 12 | B | 890 | 550 | 1.1 | 3.2 | 1.4 | 540 |
| 13 | C | 890 | 550 | 1.1 | 3.2 | 1.4 | 545 |
| 14 | D | 890 | 550 | 1.1 | 3.2 | 1.4 | 520 |
| 15 | E | 890 | 550 | 1.1 | 3.2 | 1.4 | 550 |
| 16 | F | 890 | 550 | 1.1 | 3.2 | 1.4 | 550 |
| 17 | G | 890 | 550 | 1.1 | 3.2 | 1.4 | 530 |
| 18 | H | 890 | 640 | 1.1 | 3.2 | 1.4 | 530 |
| 19 | I | 890 | 550 | 1.1 | 3.2 | 1.4 | 540 |
| 20 | I | 890 | 540 | 1.1 | 3.2 | 1.4 | — |
| 21 | J | 880 | 540 | 1.1 | 3.2 | 1.4 | 545 |
| 22 | J | 890 | 480 | 1.1 | 3.2 | 1.4 | — |
| 23 | K | 870 | 570 | 1.1 | 3.2 | 1.4 | 530 |
| 24 | K | 890 | 520 | 1.1 | 3.2 | 1.4 | — |

TABLE 2-continued

| No. | Maximum depth at which internal oxides are formed at grain boundaries in hot-rolled sheet (μm) | Difference between depths at which internal oxides are formed in cross direction of sheet (μm) | Tensile strength TS of annealed sheet (MPa) | Category |
|---|---|---|---|---|
| 1 | 1.5 | 0.9 | 624 | Example of present invention |
| 2 | 1.5 | 0.5 | 628 | Example of present invention |
| 3 | 1.4 | 1.2 | 609 | Example of present invention |
| 4 | 1.8 | 0.5 | 632 | Example of present invention |
| 5 | 1.5 | 0.8 | 607 | Example of present invention |
| 6 | 0.2 | 0.2 | 617 | Example of present invention |
| 7 | 1.0 | 0.7 | 622 | Example of present invention |
| 8 | 1.2 | 0.8 | 603 | Example of present invention |
| 9 | 1.4 | 0.6 | 610 | Example of present invention |
| 10 | 1.2 | 0.5 | 623 | Example of present invention |
| 11 | 4.6 | 0.5 | 623 | Example of present invention |
| 12 | 2.4 | 0.6 | 634 | Example of present invention |
| 13 | 1.6 | 0.6 | 728 | Example of present invention |
| 14 | 1.2 | 0.4 | 628 | Example of present invention |
| 15 | 3.8 | 1.3 | 992 | Example of present invention |
| 16 | 1.2 | 1.8 | 598 | Example of present invention |
| 17 | 1.5 | 0.5 | 835 | Example of present invention |
| 18 | 1.3 | 0.5 | 993 | Example of present invention |
| 19 | 1.5 | 0.4 | 619 | Example of present invention |
| 20 | 1.5 | 0.2 | 806 | Example of present invention |
| 21 | 1.5 | 0.3 | 786 | Example of present invention |
| 22 | 0.9 | 0.2 | 794 | Example of present invention |
| 23 | 1.8 | 0.5 | 1012 | Example of present invention |
| 24 | 1.8 | 0.4 | 1008 | Example of present invention |

Underlined items are outside the scope of the present invention.
*1 Steel type shown in Table 1.

TABLE 3

| No. | Steel type *1 | Finishing temperature (° C.) | Coiling temperature (° C.) | Impact pressure of high-pressure water for descaling (Mpa) | Thickness of hot-rolled sheet (mm) | Final sheet thickness (mm) | Alloying temperature (° C.) |
|---|---|---|---|---|---|---|---|
| 25 | K | 890 | 480 | 1.1 | 3.2 | 1.4 | 530 |
| 26 | A | <u>800</u> | 560 | 1.1 | 3.2 | 1.4 | 550 |
| 27 | A | 890 | <u>750</u> | 1.1 | 3.2 | 1.4 | 550 |
| 28 | A | 890 | <u>680</u> | 1.1 | 3.2 | 1.4 | — |
| 29 | A | 890 | 560 | <u>2.1</u> | 3.2 | 1.4 | 550 |
| 30 | A | 890 | 560 | <u>0.1</u> | 3.2 | 1.4 | 550 |
| 31 | A | 890 | 560 | <u>3.5</u> | 3.2 | 1.4 | 550 |
| 32 | L | 890 | 550 | 1.1 | 3.2 | 1.4 | 530 |
| 33 | M | 890 | 550 | 1.1 | 3.2 | 1.4 | 550 |
| 34 | N | 890 | 550 | 1.1 | 3.2 | 1.4 | 540 |
| 35 | O | 890 | 550 | 1.1 | 3.2 | 1.4 | 550 |
| 36 | P | 890 | 550 | 1.1 | 3.2 | 1.4 | 550 |
| 37 | Q | 890 | 550 | 1.1 | 3.2 | 1.4 | 560 |
| 38 | R | 890 | 550 | 1.1 | 3.2 | 1.4 | 560 |
| 39 | <u>S</u> | 890 | 550 | 1.1 | 3.2 | 1.4 | 600 |
| 40 | <u>T</u> | 890 | 560 | 1.1 | 3.2 | 1.4 | 590 |

| No. | Maximum depth at which internal oxides are formed at grain boundaries in hot-rolled sheet (μm) | Difference between depths at which internal oxides are formed in cross direction of sheet (μm) | Tensile strength TS of annealed sheet (MPa) | Category |
|---|---|---|---|---|
| 25 | 1.8 | 0.5 | 992 | Example of present invention |
| 26 | 1.5 | 0.5 | 602 | Comparative example |
| 27 | <u>15.8</u> | <u>3.2</u> | 607 | Comparative example |
| 28 | <u>8.3</u> | <u>2.4</u> | 595 | Comparative example |
| 29 | <u>7.9</u> | <u>2.8</u> | 610 | Comparative example |
| 30 | 1.5 | 0.5 | 625 | Comparative example |
| 31 | <u>10.2</u> | <u>5.2</u> | 630 | Comparative example |
| 32 | 1.4 | 0.7 | 620 | Example of present invention |
| 33 | 1.1 | 0.3 | 614 | Example of present invention |

TABLE 3-continued

| | | | | |
|---|---|---|---|---|
| 34 | 1.5 | 0.6 | 610 | Example of present invention |
| 35 | 0.8 | 0.4 | 613 | Example of present invention |
| 36 | 1.6 | 0.7 | 614 | Example of present invention |
| 37 | 0.5 | 0.2 | 619 | Example of present invention |
| 38 | 0.8 | 0.3 | 610 | Example of present invention |
| 39 | <u>9.3</u> | <u>5.5</u> | 894 | Comparative example |
| 40 | <u>8.6</u> | <u>4.9</u> | 762 | Comparative example |

Underlined items are outside the scope of the present invention.
*1 Steel type shown in Table 1.

TABLE 4

| No. | Difference in coating mass per unit area in cross direction of sheet (g/m²) | Difference in degree of alloying in cross direction of sheet (%) | Type of plated steel sheet *1 | Striped patterns | Scale defects | Surface stability | Category |
|---|---|---|---|---|---|---|---|
| 1 | 4.7 | 1.6 | GA | Not observed | Not observed | B | Example of present invention |
| 2 | 3.5 | — | GI | — | Not observed | B | Example of present invention |
| 3 | 4.2 | 1.8 | GA | Not observed | Not observed | B | Example of present invention |
| 4 | 3.2 | 1.1 | GA | Not observed | Not observed | B | Example of present invention |
| 5 | 2.8 | 1.2 | GA | Not observed | Not observed | B | Example of present invention |
| 6 | 1.8 | — | GI | — | Not observed | B | Example of present invention |
| 7 | 3.7 | 0.3 | GA | Not observed | Not observed | B | Example of present invention |
| 8 | 2.2 | 1.3 | GA | Not observed | Not observed | B | Example of present invention |
| 9 | 3.2 | 1.4 | GA | Not observed | Not observed | B | Example of present invention |
| 10 | 2.8 | — | GI | — | Not observed | B | Example of present invention |
| 11 | 3.6 | 1.7 | GA | Not observed | Not observed | B | Example of present invention |
| 12 | 1.8 | 0.6 | GA | Not observed | Not observed | A | Example of present invention |
| 13 | 1.3 | 0.3 | GA | Not observed | Not observed | A | Example of present invention |
| 14 | 1.3 | 0.2 | GA | Not observed | Not observed | A | Example of present invention |
| 15 | 1.8 | 0.8 | GA | Not observed | Not observed | A | Example of present invention |
| 16 | 3.8 | 1.5 | GA | Not observed | Not observed | B | Example of present invention |
| 17 | 1.4 | 0.2 | GA | Not observed | Not observed | A | Example of present invention |
| 18 | 0.9 | 0.5 | GA | Not observed | Not observed | A | Example of present invention |
| 19 | 1.9 | 0.3 | GA | Not observed | Not observed | A | Example of present invention |
| 20 | 0.5 | — | GI | — | Not observed | B | Example of present invention |
| 21 | 1.5 | 0.9 | GA | Not observed | Not observed | A | Example of present invention |
| 22 | 2.1 | — | GI | — | Not observed | B | Example of present invention |
| 23 | 0.6 | 0.5 | GA | Not observed | Not observed | A | Example of present invention |
| 24 | 1.1 | — | GI | — | Not observed | B | Example of present invention |

Underlined items are outside the scope of the present invention.
*1 GI represents a galvanized steel sheet and GA represents a galvannealed steel sheet.

TABLE 5

| No. | Difference in coating mass per unit area in cross direction of sheet (g/m²) | Difference in degree of alloying in cross direction of sheet (%) | Type of plated steel sheet *1 | Striped patterns | Scale defects | Surface stability | Category |
|---|---|---|---|---|---|---|---|
| 25 | 0.8 | 0.3 | GA | Not observed | Not observed | A | Example of present invention |
| 26 | 2.8 | 2.5 | GA | Not observed | Observed | C | Comparative example |
| 27 | 7.6 | 4.8 | GA | Not observed | Not observed | C | Comparative example |
| 28 | 8.5 | — | GI | — | Not observed | C | Comparative example |
| 29 | 2.6 | 4.3 | GA | Observed | Not observed | C | Comparative example |
| 30 | 1.1 | 1.5 | GA | Observed | Observed | C | Comparative example |
| 31 | 5.5 | 3.5 | GA | Observed | Not observed | C | Comparative example |
| 32 | 4.2 | 1.5 | GA | Not observed | Not observed | B | Example of present invention |
| 33 | 1.3 | 0.5 | GA | Not observed | Not observed | A | Example of present invention |
| 34 | 2.5 | 1.1 | GA | Not observed | Not observed | B | Example of present invention |
| 35 | 2.4 | 1.1 | GA | Not observed | Not observed | B | Example of present invention |
| 36 | 1.8 | 1.6 | GA | Not observed | Not observed | B | Example of present invention |
| 37 | 1.5 | 0.8 | GA | Not observed | Not observed | A | Example of present invention |
| 38 | 1.1 | 0.4 | GA | Not observed | Not observed | A | Example of present invention |
| 39 | 1.9 | 2.8 | GA | Observed | Not observed | C | Comparative example |
| 40 | 6.4 | 3.5 | GA | Observed | Not observed | C | Comparative example |

Underlined items are outside the scope of the present invention.
*1 GI represents a galvanized steel sheet and GA represents a galvannealed steel sheet.

The invention claimed is:

1. A hot-rolled steel sheet for a high-strength galvanized steel sheet or a high-strength galvannealed steel sheet, having a composition containing 0.04 mass percent to 0.20 mass percent C, 0.7 mass percent to 2.3 mass percent Si, 0.8 mass percent to 2.8 mass percent Mn, 0.1 mass percent or less P, 0.01 mass percent or less S, 0.1 mass percent or less Al, and 0.008 mass percent or less N, the remainder being Fe and inevitable impurities, wherein internal oxides containing one or more selected from the group consisting of Si, Mn, and Fe are present at grain boundaries and in grains in a base metal, the internal oxides present at the grain boundaries in the base metal are located at a depth of 2.4 μm or more and 5 μm or less from the surface of the base metal, and the difference between the depths at which the internal oxides are formed across an entirety of the steel sheet in a direction perpendicular to a thickness direction and perpendicular to a rolling direction of the steel sheet is 2 μm or less.

2. The hot-rolled steel sheet for the high-strength galvanized steel sheet or the high-strength galvannealed steel sheet according to claim 1, wherein the mass ratio (Si/Mn) of Si to Mn in the composition is less than 1.

3. The hot-rolled steel sheet for the high-strength galvanized steel sheet or the high-strength galvannealed steel sheet according to claim 2, wherein the composition further contains one or more selected from the group consisting of 0.05 mass percent to 1.0 mass percent Cr, 0.005 mass percent to 0.5 mass percent V, 0.005 mass percent to 0.5 mass percent Mo, 0.05 mass percent to 1.0 mass percent Ni, and 0.05 mass percent to 1.0 mass percent Cu.

4. The hot-rolled steel sheet for the high-strength galvanized steel sheet or the high-strength galvannealed steel sheet according to claim 3, wherein the composition further contains one or more selected from the group consisting of 0.01 mass percent to 0.1 mass percent Ti, 0.01 mass percent to 0.1 mass percent Nb, and 0.0003 mass percent to 0.0050 mass percent B.

5. The hot-rolled steel sheet for the high-strength galvanized steel sheet or the high-strength galvannealed steel sheet according to claim 4, wherein the composition further contains one or more selected from 0.001 mass percent to 0.005 mass percent Ca and 0.001 mass percent to 0.005 mass percent of a REM.

6. The hot-rolled steel sheet for the high-strength galvanized steel sheet or the high-strength galvannealed steel sheet according to claim 3, wherein the composition further contains one or more selected from 0.001 mass percent to 0.005 mass percent Ca and 0.001 mass percent to 0.005 mass percent of a REM.

7. The hot-rolled steel sheet for the high-strength galvanized steel sheet or the high-strength galvannealed steel sheet according to claim 2, wherein the composition further contains one or more selected from the group consisting of 0.01 mass percent to 0.1 mass percent Ti, 0.01 mass percent to 0.1 mass percent Nb, and 0.0003 mass percent to 0.0050 mass percent B.

8. The hot-rolled steel sheet for the high-strength galvanized steel sheet or the high-strength galvannealed steel sheet according to claim 7, wherein the composition further contains one or more selected from 0.001 mass percent to 0.005 mass percent Ca and 0.001 mass percent to 0.005 mass percent of a REM.

9. The hot-rolled steel sheet for the high-strength galvanized steel sheet or the high-strength galvannealed steel sheet according to claim 2, wherein the composition further contains one or more selected from 0.001 mass percent to 0.005 mass percent Ca and 0.001 mass percent to 0.005 mass percent of a REM.

10. The hot-rolled steel sheet for the high-strength galvanized steel sheet or the high-strength galvannealed steel sheet according to claim 1, wherein the composition further contains one or more selected from the group consisting of 0.05 mass percent to 1.0 mass percent Cr, 0.005 mass percent to 0.5 mass percent V, 0.005 mass percent to 0.5 mass percent Mo, 0.05 mass percent to 1.0 mass percent Ni, and 0.05 mass percent to 1.0 mass percent Cu.

11. The hot-rolled steel sheet for the high-strength galvanized steel sheet or the high-strength galvannealed steel sheet according to claim 10, wherein the composition further contains one or more selected from the group consisting of 0.01 mass percent to 0.1 mass percent Ti, 0.01 mass percent to 0.1 mass percent Nb, and 0.0003 mass percent to 0.0050 mass percent B.

12. The hot-rolled steel sheet for the high-strength galvanized steel sheet or the high-strength galvannealed steel sheet according to claim 11, wherein the composition further contains one or more selected from 0.001 mass percent to 0.005 mass percent Ca and 0.001 mass percent to 0.005 mass percent of a REM.

13. The hot-rolled steel sheet for the high-strength galvanized steel sheet or the high-strength galvannealed steel sheet according to claim 10, wherein the composition further contains one or more selected from 0.001 mass percent to 0.005 mass percent Ca and 0.001 mass percent to 0.005 mass percent of a REM.

14. The hot-rolled steel sheet for the high-strength galvanized steel sheet or the high-strength galvannealed steel sheet according to claim 1, wherein the composition further contains one or more selected from the group consisting of 0.01 mass percent to 0.1 mass percent Ti, 0.01 mass percent to 0.1 mass percent Nb, and 0.0003 mass percent to 0.0050 mass percent B.

15. The hot-rolled steel sheet for the high-strength galvanized steel sheet or the high-strength galvannealed steel sheet according to claim 14, wherein the composition further contains one or more selected from 0.001 mass percent to 0.005 mass percent Ca and 0.001 mass percent to 0.005 mass percent of a REM.

16. The hot-rolled steel sheet for the high-strength galvanized steel sheet or the high-strength galvannealed steel sheet according to claim 1, wherein the composition further contains one or more selected from 0.001 mass percent to 0.005 mass percent Ca and 0.001 mass percent to 0.005 mass percent of a REM.

* * * * *